US008146859B2

(12) United States Patent  
Mariat (10) Patent No.: US 8,146,859 B2
(45) Date of Patent: Apr. 3, 2012

(54) AIRCRAFT MODULE AND AIRCRAFT INCLUDING SUCH A MODULE

(75) Inventor: Sylvain Mariat, Seilh (FR)

(73) Assignee: Airbus, Blagnac (FR)

( * ) Notice: Subject to any disclaimer, the term of this patent is extended or adjusted under 35 U.S.C. 154(b) by 1055 days.

(21) Appl. No.: 12/030,544

(22) Filed: Feb. 13, 2008

(65) Prior Publication Data

US 2008/0191523 A1 Aug. 14, 2008

(30) Foreign Application Priority Data

Feb. 13, 2007 (FR) ..................................... 07 01016

(51) Int. Cl.
*B64D 11/00* (2006.01)
*B64D 11/04* (2006.01)
*B64D 11/06* (2006.01)
(52) U.S. Cl. .................. 244/118.5; 244/122 R; 297/140
(58) Field of Classification Search ............... 244/118.1, 244/118.2, 118.5, 118.6, 122 R, 129.1; 105/327, 105/328; 297/140, 141, 147; 126/24; 312/235.3, 312/235.7, 235.8, 280, 281, 282, 313, 317.3
See application file for complete search history.

(56) References Cited

U.S. PATENT DOCUMENTS

| 421,118 | A | * | 2/1890 | Walsh ........................... 297/147 |
| 1,349,634 | A | * | 8/1920 | Stern ............................. 312/282 |
| 1,947,554 | A | * | 2/1934 | Kahn ............................ 312/282 |
| 4,913,487 | A |  | 4/1990 | Breckel et al. |
| 5,020,867 | A | * | 6/1991 | McManus .................. 312/317.3 |
| 6,254,160 | B1 |  | 7/2001 | Marriott et al. |
| 2005/0077761 | A1 |  | 4/2005 | Dryburgh et al. |
| 2006/0060704 | A1 | * | 3/2006 | Lavie et al. ................ 244/118.5 |

FOREIGN PATENT DOCUMENTS

| DE | 10 2004 058 204 A1 | 6/2006 |
| EP | 1 118 537 A2 | 7/2001 |
| JP | 10309973 A * | 11/1998 |

* cited by examiner

*Primary Examiner* — Tien Dinh
*Assistant Examiner* — Richard R Green
(74) *Attorney, Agent, or Firm* — Oblon, Spivak, McClelland, Maier & Neustadt, L.L.P.

(57) ABSTRACT

An aircraft module comprising a unit that includes a horizontal working surface from which a vertical wall extends downward; a seat adjacent to the vertical wall; and at least one removable shelf that occupies several positions, and in one of these positions, referred to as working position, the at least one shelf extends horizontally from the horizontal working surface above the seat that is in folded-back position, so as to cover the entirety of the folded-back seat.

13 Claims, 8 Drawing Sheets

AIRCRAFT MODULE AND AIRCRAFT INCLUDING SUCH A MODULE

The invention relates to an aircraft module as well as to an aircraft comprising such a module.

On commercial flights, in certain zones of the aircraft, spaces are fitted out for the passengers' relaxation.

For example, carts on which the crew leaves self-service beverages for the passengers are found there.

Also found are more sophisticated units serving as a bar, sometimes offering snacks, and which are arranged in the zones where the passengers may go.

There is known a type of unit serving as a bar and that comprises a lower portion containing carts used for the distribution of various items (beverages, tray meals . . . ) and an upper portion in which there is provided, in particular, storage space for beverages, snacks . . . .

A horizontal working surface is arranged above the lower portion and is used, in particular, by passengers who wish to help themselves to drinks or food.

Furthermore, mandatory security components, such as seats for the crew, are provided next to these bar units.

The arrangement of such a seat along one of the walls of the lower portion of a bar unit forms an overhang that represents a hindrance for passengers wishing to approach the working surface, even when the seat is in folded-back position.

In addition, it is not unusual for liquid to spill onto the seat as a result of clumsiness of the individual who is helping himself to a beverage.

When the seat is associated with other pieces of security equipment such as telephones for the crew, these pieces of equipment also are subject to risks of soiling, that is even likely to jeopardize the functioning thereof.

It will be noted that the drawbacks set forth above are not connected solely to a unit serving as a bar.

They may be encountered, in fact, with a unit equipped with a working surface and with a seat adjacent to the unit, below the working surface.

This invention seeks to remedy at least one of the drawbacks of the prior art by proposing an aircraft module or layout comprising:
  a unit comprising a horizontal working surface from which a vertical wall extends downward;
  a seat adjacent to the said vertical wall, characterized in that the module comprises at least one removable shelf that is able to occupy several positions, and in one of these positions, referred to as working position, the said at least one shelf extends horizontally from the horizontal working surface, continuing the latter above the seat that is in folded-back position, so as to cover the entirety of the folded-back seat.

Thus, by arranging the shelf above the zone where the seat is placed and covering the entirety of the seat, the latter is protected against soiling. When the unit serves as a bar for passengers of the aircraft, the seat is thus protected against untimely spilling of beverages and other products likely to soil the seat and damage the associated piece or pieces of electronic equipment.

In addition, the shelf extends the working surface, which enlarges the use space of the unit.

This greater convenience of use of the relaxation space is accompanied by a decrease in risks of clumsiness which resulted from a smaller working surface.

It will be noted that the removable nature of the shelf (or the shelves) conveys the fact that it may be fastened or attached temporarily to the unit, in one position, and that it may be removed or detached from this position (as desired), to be fastened or attached temporarily to the unit in another position.

These operations allowing the fastening and removal of the shelf (or the shelves) are easy to accomplish and rapid.

According to one characteristic, in a first storage position, the said at least one shelf serves as a cover for a storage space of the unit.

The removable shelf that is used to extend the working surface and to protect the seat forms part of the bar unit where it provides, in another position, another functionality. It therefore does not involve an additional component in terms of mass taken on board.

According to one characteristic, in a second storage position, the said at least one shelf is folded back against the working surface.

This second storage position is used temporarily when the crew must use the seat urgently, for example in case of turbulence.

The shelf then is turned down against the working surface that comprises, for example, a hollowed-out area provided for this purpose for positioning the shelf therein.

According to one characteristic, the working surface is delimited at one corner of the unit by two perpendicular edges, the said at least one shelf being fastened, in its working position, by a first one of its edges to one of the two perpendicular edges of the working surface, the said at least one shelf having a second edge perpendicular to the first and that is located in the continuation of the other of the two perpendicular edges of the working surface.

The shelf thus is arranged at one of the corners of the unit, in alignment with one of the edges of the latter, so as not to hamper the movement of passengers along this edge of the unit.

According to one characteristic, the module comprises two shelves, a main shelf fastened to the working surface and a secondary shelf fastened to the main shelf in jointed manner.

Thus the additional working surface is adjustable.

According to one characteristic, the secondary shelf is able to occupy two positions, a first position in which it is arranged horizontally and a second position in which it extends vertically downward along the seat.

The secondary shelf may be used in horizontal position to enlarge the working surface and also to protect the seat.

In vertical position, the secondary shelf protects the seat on one of its sides.

It furthermore is possible to have two secondary shelves to protect the seat on two opposite sides, a third secondary shelf even being able to be provided for the protection of the front of the seat.

According to one characteristic, the secondary shelf is jointed on one of the edges of the main shelf that is perpendicular to the one in contact with the working surface.

In the case of a sole secondary shelf, the latter is arranged, for example, on the side of the main-shelf edge that is opposite the edge situated in the continuation of the edge of the unit along which the passengers may move freely.

Thus the secondary shelf, even placed in horizontal position, in no way hinders the comings and goings of the passengers.

According to one characteristic, the seat comprises a sitting surface that is able to occupy two positions, one vertical when the seat is folded back against the vertical wall of the unit and the other horizontal when the seat is opened out.

By folding back the seat, the latter is even better protected from possible soiling and damage.

According to one characteristic, the said at least one shelf is in working position when the seat is folded back.

According to one characteristic, the said at least one shelf is fastened to the working surface in removable manner by jointing means.

It thus is possible to place the shelf in several positions with the aid of the jointed connection.

For example, the shelf is fastened to the working surface by a hinge that is clamped in removable manner in a cavity arranged in a fixed hinge component of the working surface.

According to one characteristic, the unit comprises, on the one hand, a bottom portion on which there is arranged a horizontal panel a part of which forms the working surface and, on the other hand, a top portion that extends upward from the horizontal panel and contains one or more storage spaces.

The bottom portion of the unit contains, for example, carts intended for distribution of items to the passengers.

The invention also has as its object an aircraft that comprises one or more aircraft modules such as the one briefly explained above.

Other characteristics and advantages will become apparent in the course of the description that is going to follow, given solely by way of non-limitative example and presented with reference to the attached drawings, on which.

Figure 1:
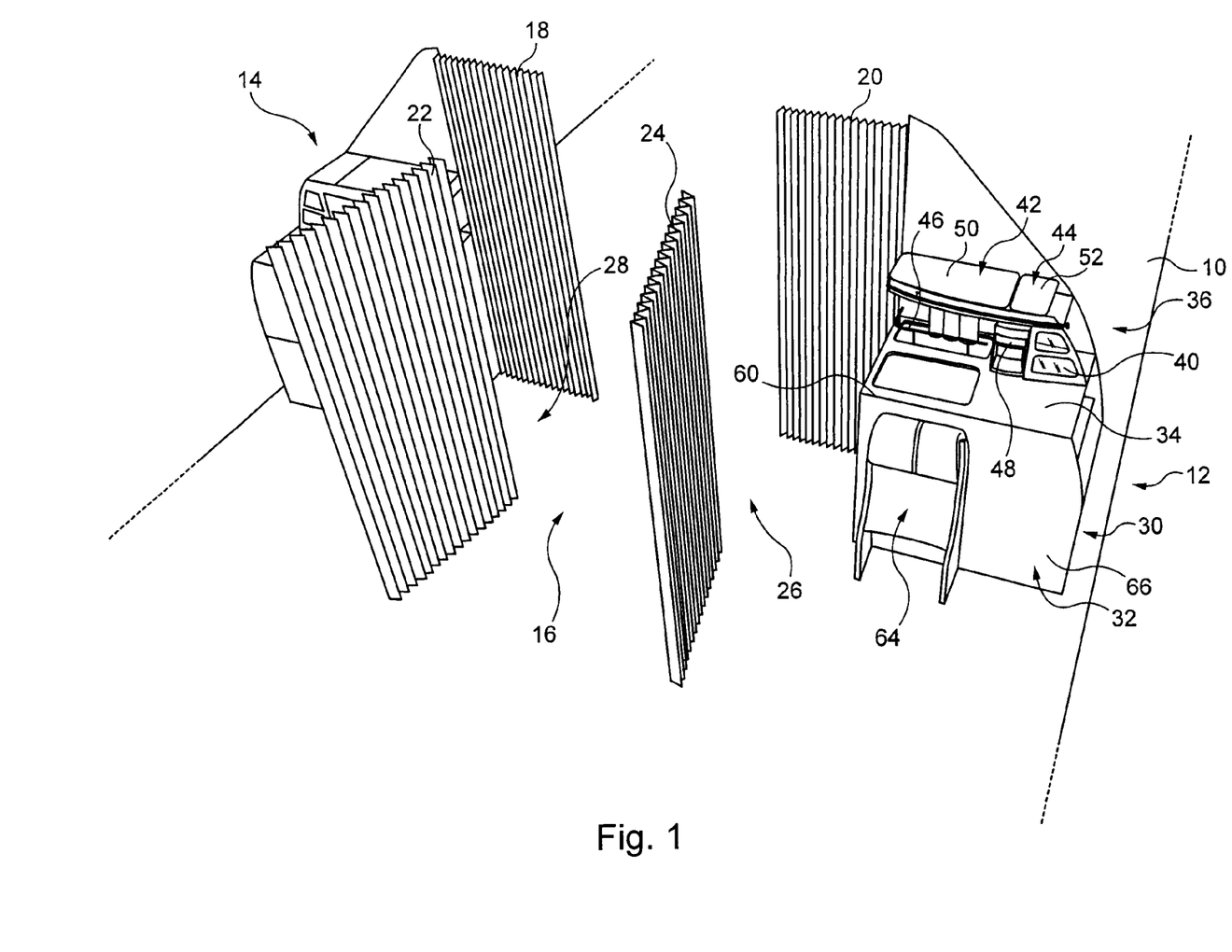
FIG. 1 is a partial general schematic view of positioning of an aircraft module according to the invention.

FIG. 1 schematically illustrates the interior of an aircraft cabin comprising a floor 10 on which several pieces of equipment and structural elements have been arranged.

The fuselage of the aircraft and the internal presentation of the cabin have not been depicted for the sake of simplification.

In the cabin there thus are provided two aircraft modules or subsets 12 and 14 according to the invention, which are arranged on both sides of a central aisle 16 along which the passengers and the crew may move freely.

Different wall components 18, 20, 22 and 24 are arranged on the floor 10 near the modules 12 and 14 and define with the latter additional passages or aisles 26 and 28 for the comings and goings of the passengers and the crew.

It will be noted that individuals using these passages walk alongside the aircraft modules 12 and 14.

These two modules or arrangements are identical and only one, namely module 12, now is going to be described.

This aircraft module or fitting is in the form of a unit 30 comprising a bottom portion 32 topped by a horizontal working surface 34 and a top portion 36 that extends from the latter.

More particularly, the bottom portion 32 contains a housing provided for the storage of carts ("trolleys" in Anglo-Saxon terminology) that are used by the crew to distribute, to the passengers seated in their seats, various items such as beverages, sandwiches, tray meals . . . .

Figure 2:
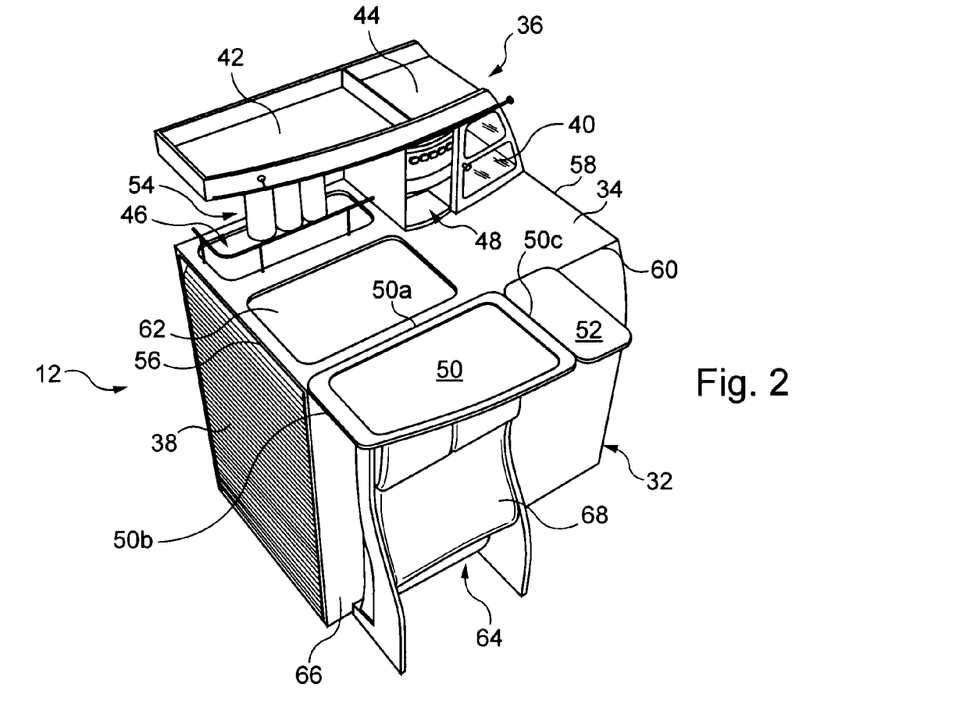
FIGS. 2 and 7 to 10 illustrate the use of the module of FIG. 1 in several scenarios.

This storage housing or casing is closed off by a removable wall 38 visible on FIG. 2 and that is in the form of a rolling shutter, for example.

This wall is arranged opposite the passage 26, on one of the sides of the unit.

The top portion 36 of the unit covers only a part of the working surface (the one located at the back of the unit in the view depicted on FIGS. 1 and 2), extends upward and comprises several storage spaces 40, 42, 44 and 46.

As depicted in greater detail on FIG. 2, the space 40 closed off by a door is provided for the storage of glasses, the spaces 42 and 44 left open on FIG. 2 and closed off on FIG. 1 by the respective covers 50 and 52 are provided for the temporary storage of used glasses.

The storage space 46 is a free space making it possible to store bottles 54 ready to be used by the passengers.

Next to the storage space 40 and beneath the storage spaces 42, 44, a coffee machine is installed.

Working surface 34 situated above the lower portion 32 of the unit 12 extends along the front face of the unit between two opposite lateral edges 56, 58.

Near one of the corners of the unit, the working surface is delimited by two perpendicular edges, namely the lateral edge 56 and a longitudinal edge 60 arranged on the front-face side of the unit.

The portion of the horizontal working space arranged near this corner of the unit comprises a vertical recess 62, thus forming a rim in relation to the area of the working surface 34.

The presence of this rim makes it possible to prevent items such as glasses and bottles from being able to slide off the working surface in case of slight tilting of the aircraft.

Furthermore, this hollowed-out area 62 makes it possible, under certain circumstances that will be explained in detail later, to store one or more items temporarily.

A seat 64 intended for the crew (commercial flight personnel) and not for the passengers is arranged along one of the vertical walls 66 of the unit.

This vertical wall corresponding to the front face of the unit is arranged adjacent to the lateral wall 38 and extends downward from the edge 60 of the working surface 34.

The seat 64 is, for example, fastened to the floor like the passenger seats. This seat comprises a sitting surface 68 which is able to occupy two positions: one more or less vertical position depicted on FIG. 2, when the seat is folded back against the wall 66, and a second horizontal position, not depicted, when the seat is opened out in order to allow use thereof by the crew.

On FIG. 2, the removable covers 50 and 52 of FIG. 1 have been depicted in a second use position, in a location different from that of FIG. 1 where they occupy a first use position (storage).

More particularly, the cover 50 constitutes a shelf, referred to as main shelf, that on FIG. 2 is placed in working position, extending toward the front of the unit from the longitudinal edge 60 of the working surface, to continue the latter at the base of the folded-back seat.

The passengers thus have more space for helping themselves.

The main shelf 50 is fastened more particularly by a first longitudinal rear edge 50a to the edge 60 of the working surface 34 of the unit in a position such that a second lateral edge 50b of the shelf is situated more or less in the extension of the lateral edge 56 of the working surface.

Thus the shelf does not jut out laterally from the unit, which makes it possible not to block the passage 26 of FIG. 1 and therefore not to hinder the free movement of the passengers and the crew.

Figure 3:
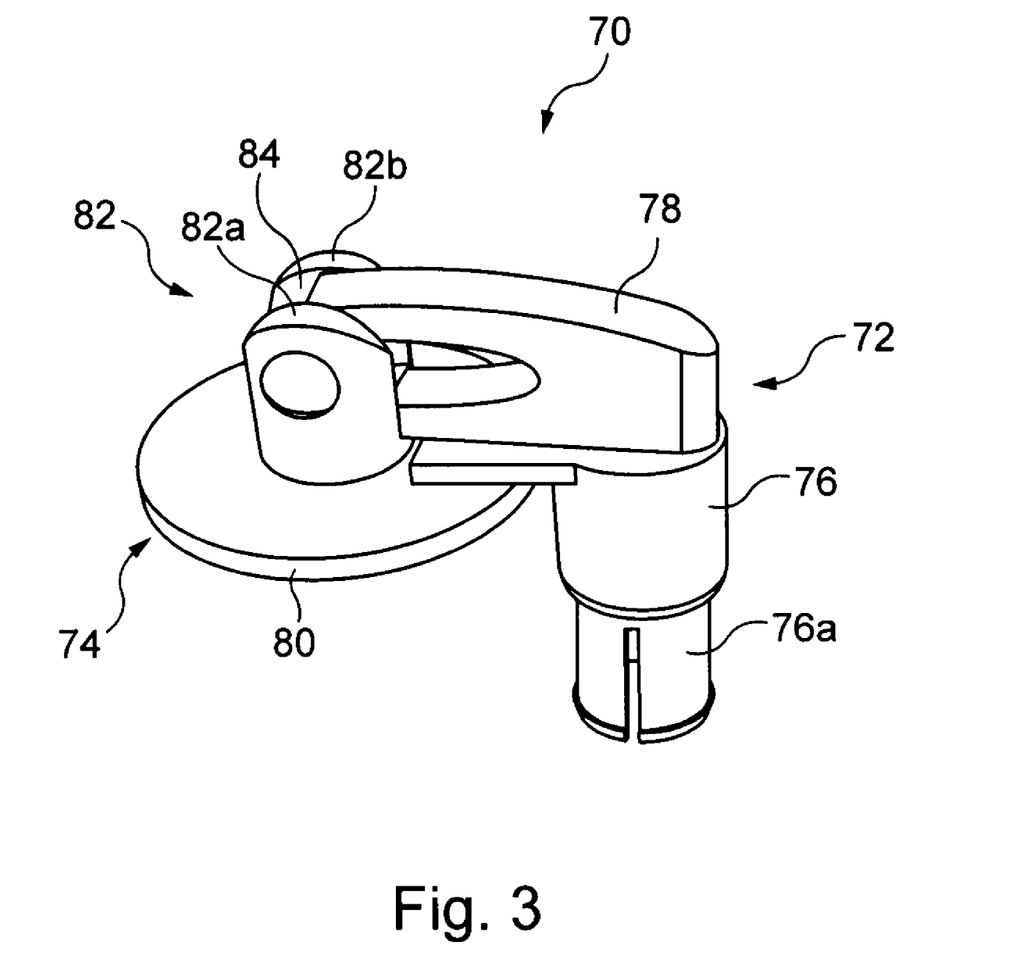
FIGS. 3 to 5 illustrate successive positions of the means for jointing of the shelf to the working surface.
Figure 4:
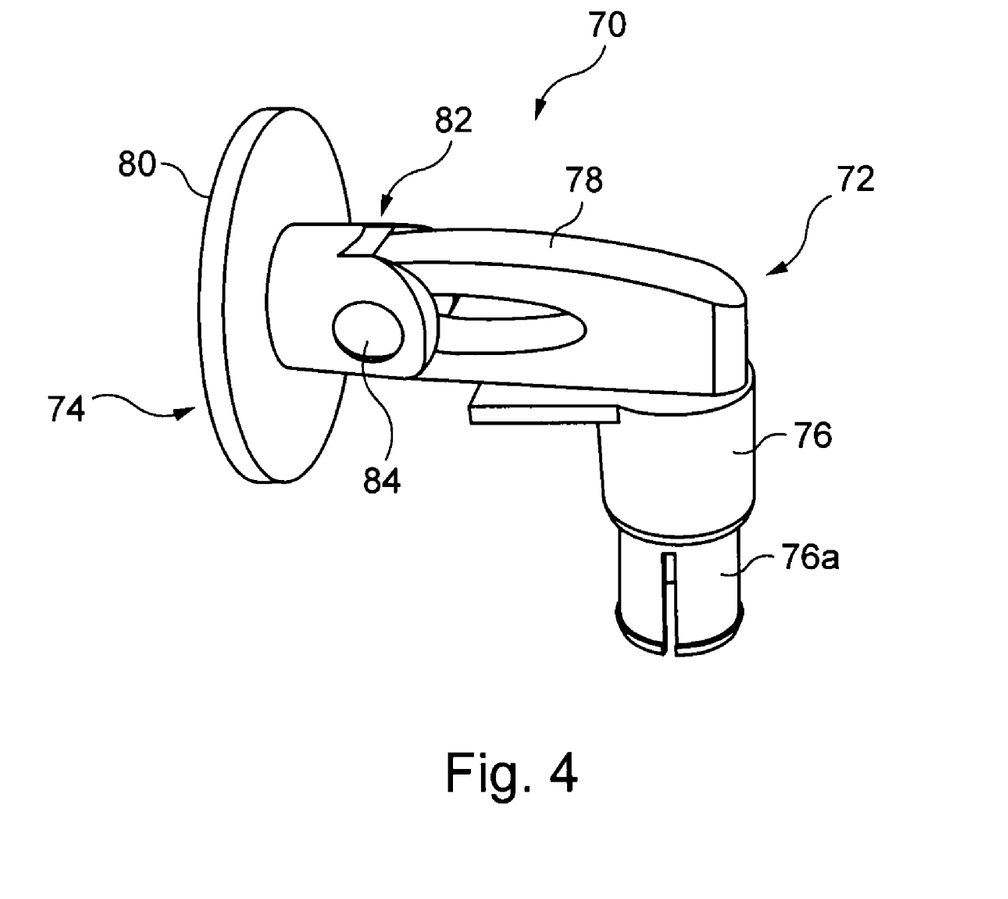
Figure 5:
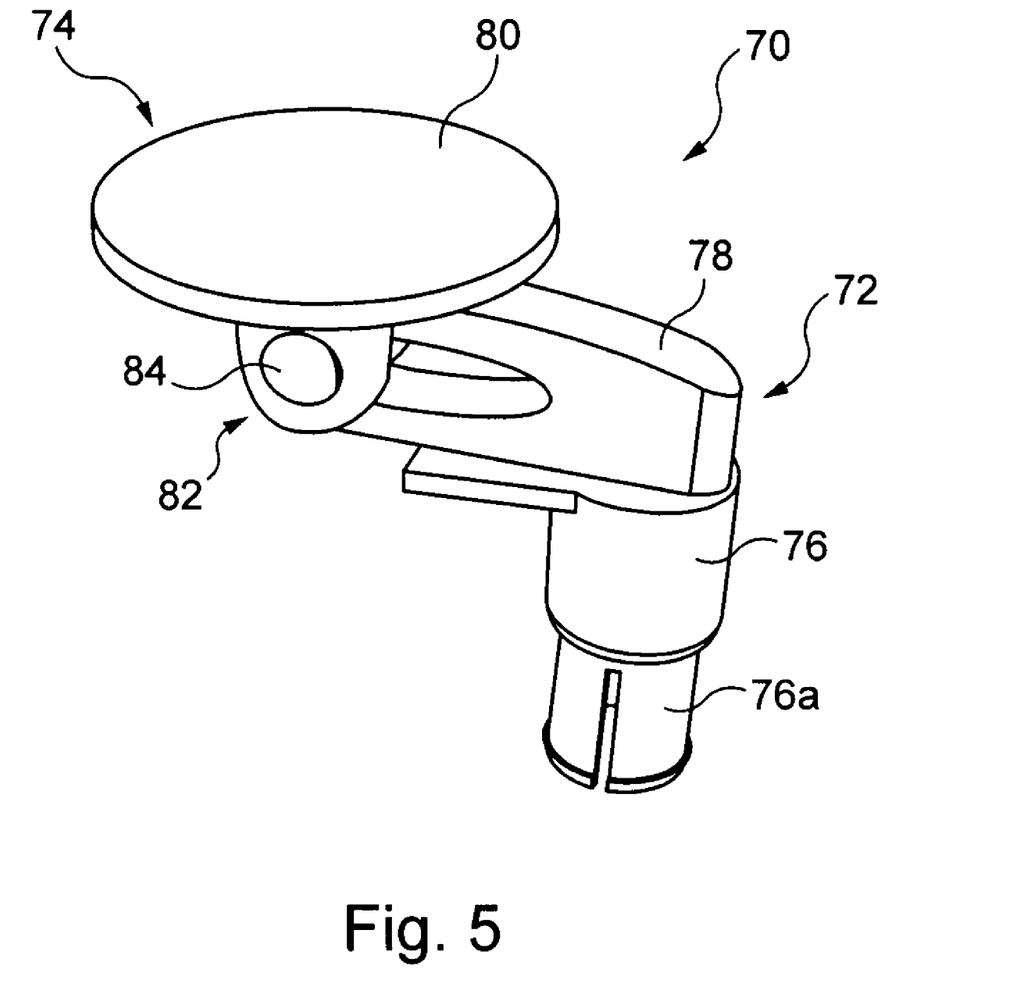

The shelf 50 is fastened to the working surface in removable manner by jointing means 70 illustrated in different positions on FIGS. 3 to 5.

These means forming a removable hinge comprise a fixed part 72 integral with the working surface and a movable part 74 integral with the shelf (FIGS. 3 to 5). The movable part is clamped in removable manner to the inside of a housing arranged in the fixed part.

More particularly, the fixed part, the jointing support, comprises, on the one hand, a vertical base 76, a cylindrical part 76a of which is provided for being inserted into a corresponding hole of the edge of the working surface and, on the other hand, a horizontal extension in the form of pincers 78, the two arms of which define with one another the aforesaid housing.

The movable part 74 comprises a base 80 in the form of a disk on which there is arranged a part in the form of a cap 82. This part has two lateral uprights 82a, 82b facing one another, each traversed by an orifice for the passage of a mechanism 84 mounted to rotate freely around an axis passing through these aligned orifices.

The mechanism 84 originally has a more or less cylindrical form which has been partially hollowed out following a more or less half-diameter of the cylinder, on one or two opposite portions, so as to form one or two longitudinal hollowed-out areas.

As depicted on FIGS. 3 to 5, when it is wished to fasten the shelf to the working surface temporarily, the mechanism 84 is ratcheted onto the pincer 78. Thus the two vertically aligned arms of the pincer engage respectively in the longitudinal hollowed-out areas with dimensions more or less corresponding to the rotary mechanism 84 and are held in position with the aid of the slightly retractable ends of the pincer arms and the hollowed-out areas of appropriate form.

It will be noted that in the presence of a sole longitudinal hollowed-out area, only one of the pincer arms is inserted into the hollowed-out area, the other being in contact with the outer cylindrical surface of the mechanism 84.

With the aid of this hinge, the shelf can make a 180° rotation, as the different positions of the hinge on FIGS. 3 to 5 demonstrate.

Figure 6:
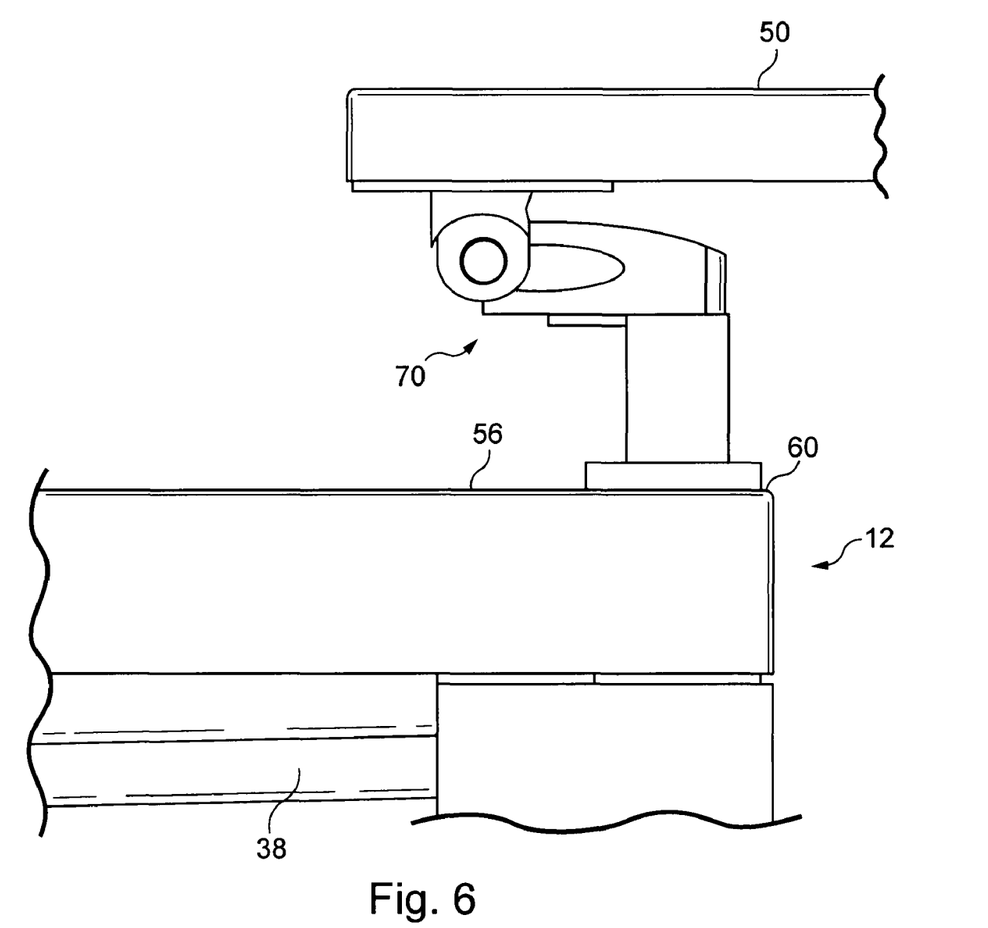
FIG. 6 is a partial enlarged view showing, in an opened-out position, the shelf fastened to the unit 12 with the aid of the jointing means of FIGS. 3 to 5.

FIG. 6 depicts a partial view of the means for temporary assembly 70 of the shelf 50 and of the unit 12 in the position of FIG. 2.

The movable part 74 of the jointing means is fastened to the shelf 50 by way of the base 80 by gluing, screwing or any other appropriate means.

More particularly, the base is fastened to the face of the shelf opposite the one that serves as an additional working surface.

It will be noted, however, that for a better guidance of the shelf during pivoting thereof and for a firmer support in position (FIG. 6), two assembly means forming a hinge 70 are used.

Furthermore, the second cover 52 is used as a secondary shelf that is fastened in jointed manner to the main shelf 50, in particular, on a second lateral edge 50c of the latter.

It will be noted that, on FIG. 2, the secondary shelf 52 is arranged adjacent to the lateral edge 50c of the main shelf that is opposite edge 50b arranged along the passage frequented by the passengers.

Thus, the secondary shelf 52 placed in horizontal position, as depicted on FIG. 2, likewise does not cause any hindrance for the passengers using the aisle 26.

Figure 7:
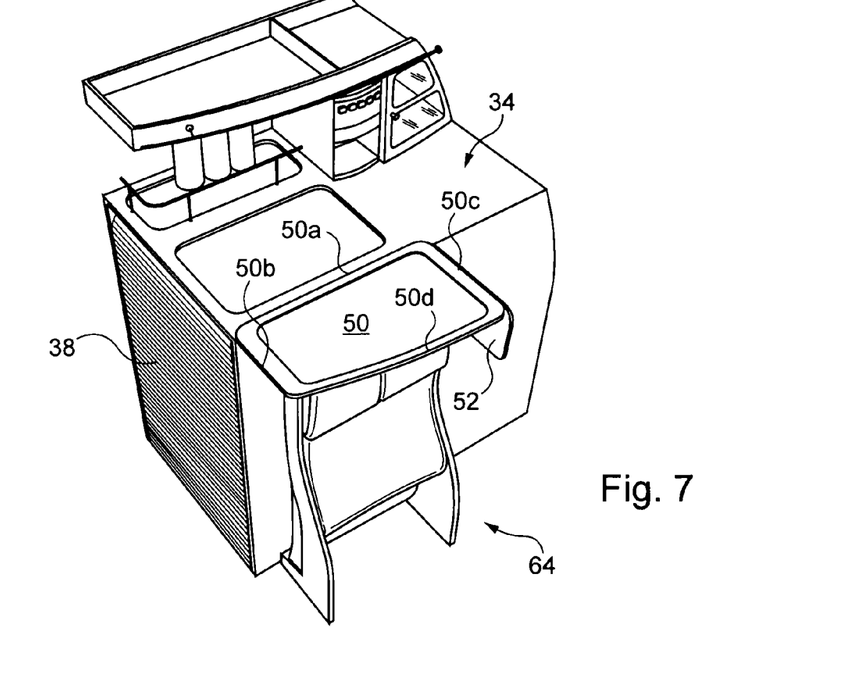

FIG. 7 illustrates a second position of the secondary shelf, for the latter is going to come naturally into vertical position because of the jointing hinge provided between the shelves 50 and 52.

It will be noted that the first position of the secondary shelf 52 illustrated on FIG. 2 may be used as a stable position to further increase the working surface provided to the passengers and also to protect the seat arranged in folded-back position against soiling from various sources. In this case, one or more fastening mechanisms are arranged beneath the shelves 50 and 52 in order to prevent vertical pivoting of the shelf 52.

It may involve, for example, simple rotary stop mechanisms integral with the shelf 50 by way of one of their ends and which, under the action of a rotation, come to be positioned beneath the shelf 50 by way of their opposite end.

In the position of FIG. 7, the shelf 52 extends vertically downward, along the upper portion of the seat 64, in order to provide the latter with a protection additional to that provided by the main shelf 50 that is situated above the seat.

According to a variant not depicted on the figures, another secondary shelf may be arranged along the opposite lateral edge 50b of the main shelf 50, in order also to protect the seat on the opposite side thereof in relation to the side protected by the shelf 52.

According to yet another variant not depicted on the figures, an additional secondary shelf may be arranged on the longitudinal front edge 50d of the main shelf, which edge is opposite the rear longitudinal edge 50a fastened to the working surface.

This additional secondary shelf makes it possible, on the one hand, to further increase the area of the working surface and, on the other hand, to protect the seat more effectively on the front portion thereof.

It will be noted that the shelves 50 and 52, when they are serving as covers each for closing off a storage space of the unit, are not necessarily fastened to one another. Thus these removable shelves may only be made integral with one another at the time of their setting-up in the working position depicted on FIGS. 2 and 7.

Furthermore, the removable nature of these shelves is particularly helpful since it makes it possible to use them easily and rapidly during boarding, when the bar is closed and the storage spaces must be closed off and, on the other hand, during use of the bar, at the time of their setting-up as a continuation of the working surface, at least as regards the main shelf.

It then is of little importance that the storage spaces 42 and 44 are exposed.

These spaces moreover are used as temporary storage spaces when the bar is open.

Figure 8:
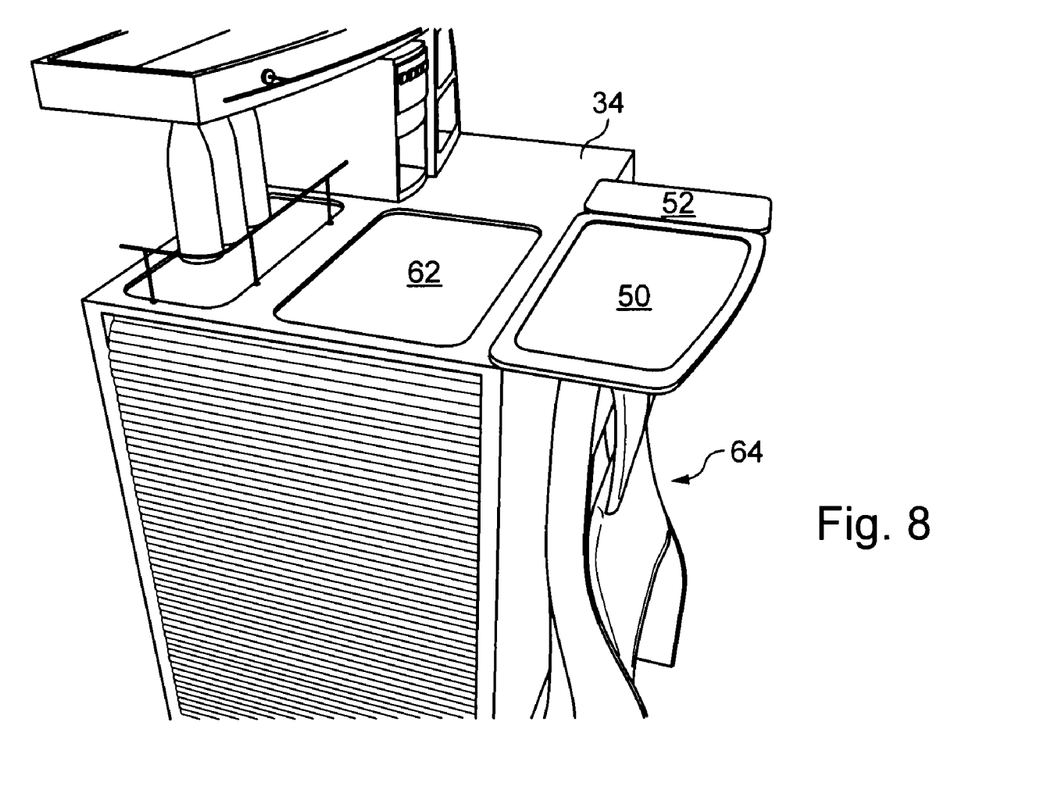
Figure 9:
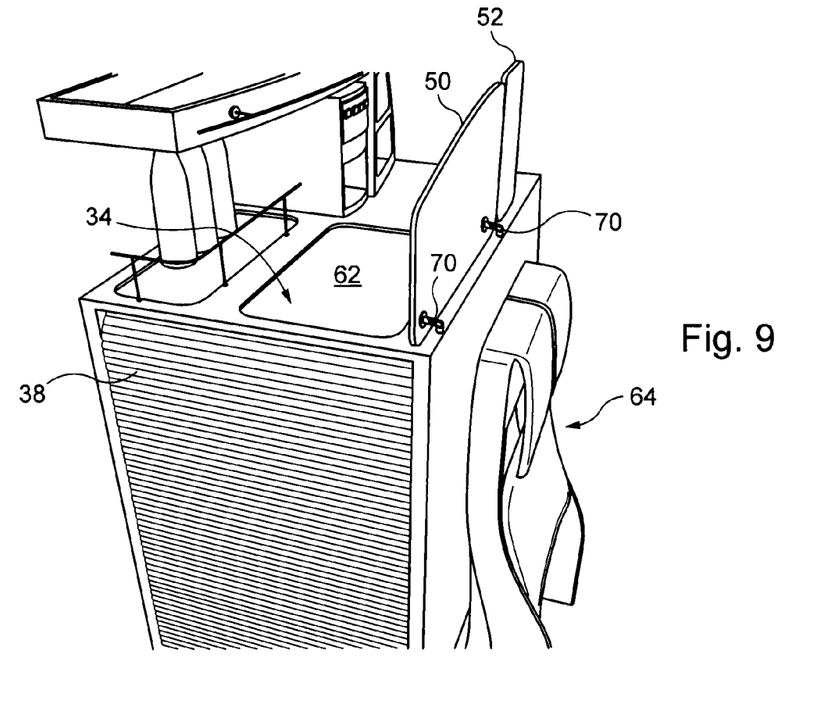
Figure 10:
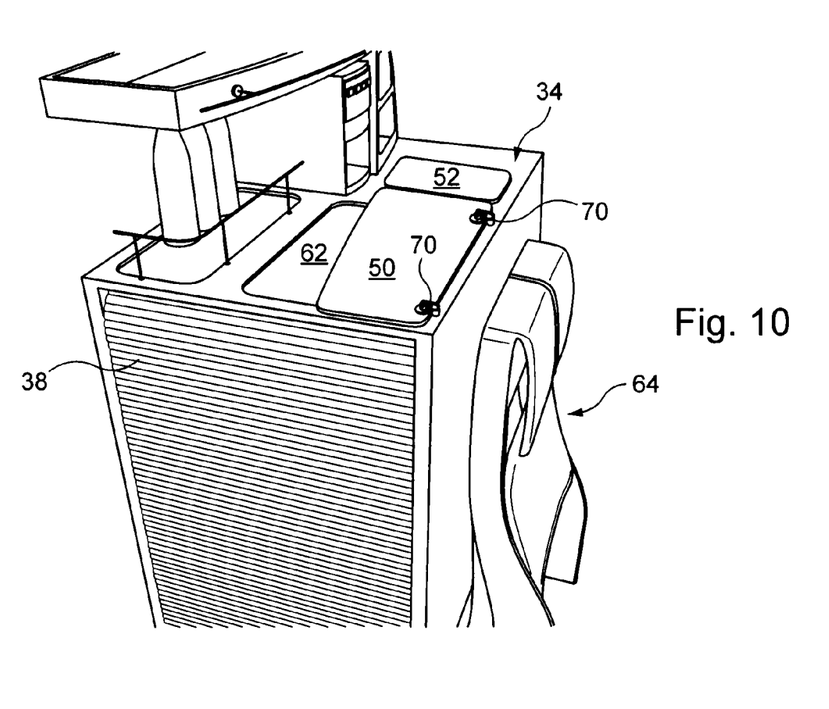

FIGS. 8, 9 and 10 illustrate the shifting of the shelves 50 and 52 to another storage position, referred to as intermediate storage position, that is used during flight, for example, in case of turbulence.

Actually, under these conditions, the seat 64 is opened out to be used by one of the crew members, and the shelves in working position then constitute a hindrance to this use.

Thus, the crew member wishing to sit down raises the secondary shelf 52 to bring it into horizontal position (FIG. 8), then raises the set of the two shelves 50 and 52 by causing them to make a 180° rotation (with the aid of the two hinge sets 70 set apart from one another along the front edge of the working surface) to come to rest against the working surface 34 (FIGS. 9 and 10).

The main shelf 50 is always secured to the aforesaid fastening means in order to ensure a stable temporary storage position, and as for the secondary shelf 52, it remains fastened to the main shelf 50 and therefore held in position against the working surface or else folded over against the main shelf with the aid of the hinge.

It will be noted that, in this embodiment, the hollowed-out area 62 implemented in the working surface 34 is not used for temporary storage of the main shelf 50.

In a variant not depicted, however, the dimensions of the shelf 50 are slightly less than those of the hollowed-out portion 62 in order that the shelf 50 may come to be inserted therein.

The hollowed-out portion 62 also may have dimensions allowing it to accommodate the secondary shelf 52.

However, inasmuch as the secondary shelf 52 is jointed on the shelf 50, the storage of the secondary shelf 52 is less problematic since the latter can come to be folded back against the shelf 50 once the latter is in storage position.

The invention claimed is:

1. Aircraft module comprising:
   a unit comprising a horizontal working surface from which a vertical wall extends downward;
   a seat that folds-back against the vertical wall; and
   at least one removable shelf that occupies several positions including a working position in which the at least one shelf extends horizontally from the horizontal working surface above the seat that is in a folded-back position, so as to cover the entirety of the seat in the folded-back position.

2. Aircraft module according to claim 1, wherein the at least one shelf includes a storage position in which the at least one shelf is folded back against the working surface.

3. Aircraft module according to claim 1, wherein the working surface is delimited at one corner of the unit by two perpendicular edges, the said at least one shelf being fastened, in its working position, by a first edge to one of the two perpendicular edges of the working surface, the said at least one shelf having a second edge perpendicular to the first edge and that is located in continuation of the other of the two perpendicular edges of the working surface.

4. Aircraft module according to claim 1, wherein the at least one removable shelf includes a main shelf fastened to the working surface and a secondary shelf fastened to the main shelf in a jointed manner.

5. Aircraft module according to claim 4, wherein the secondary shelf is that occupies two positions, a first position in which the secondary shelf is arranged horizontally and a second position in which the secondary shelf extends vertically downward along the seat.

6. Aircraft module according to claim 4, wherein the secondary shelf is jointed on one of the edges of the main shelf that is perpendicular to the one in contact with the working surface.

7. Aircraft module according to claim 1, wherein the seat comprises a sitting surface that occupies two positions, a vertical position when the seat is folded back against the vertical wall of the unit and a horizontal position when the seat is opened out.

8. Aircraft module according to claim 7, wherein the said at least one shelf is in the working position when the seat is folded back.

9. Aircraft module according to claim 1, wherein the said at least one shelf is fastened to the working surface in a removable manner by at least one joint.

10. Aircraft module according to claim 1, wherein
    the unit further includes a bottom portion topped with the working surface, and
    the top portion includes a plurality of storage spaces.

11. An aircraft comprising an aircraft module according to claim 1.

12. Aircraft module according to claim 1, wherein
    the unit includes a top portion that extends upward from the horizontal working surface, the top portion partially covering the horizontal working surface in a horizontal direction, and
    the at least one removable shelf includes a storage position in which the at least one shelf covers at least one storage space of the top portion.

13. Aircraft module according to claim 1, wherein the horizontal working surface does not extend above the seat and does not cover the seat in the folded-back position.

* * * * *